April 21, 1925.
T. STENHOUSE
1,534,878
CLAMP FOR GLASS MOLDS
Filed Sept. 17, 1923    2 Sheets-Sheet 1
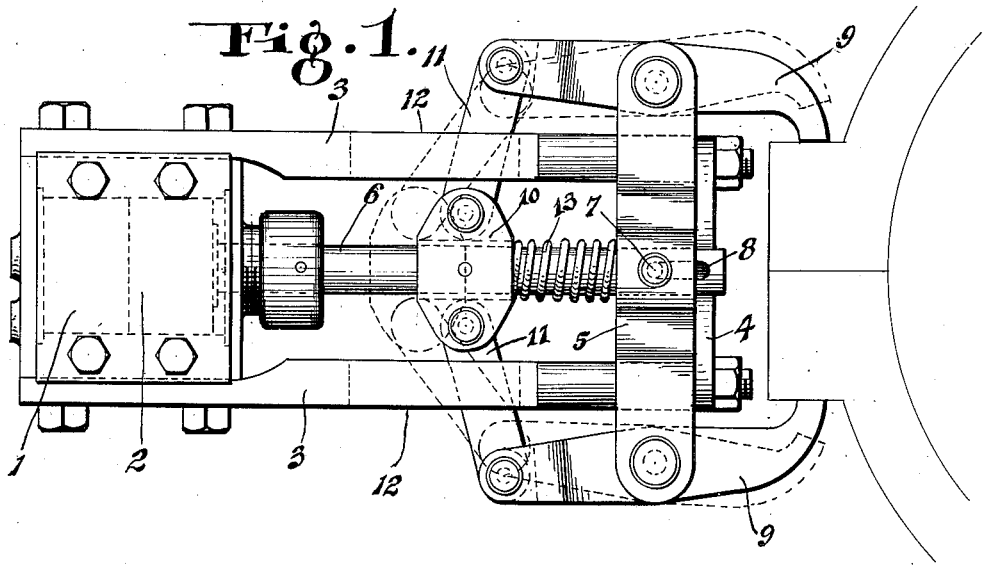
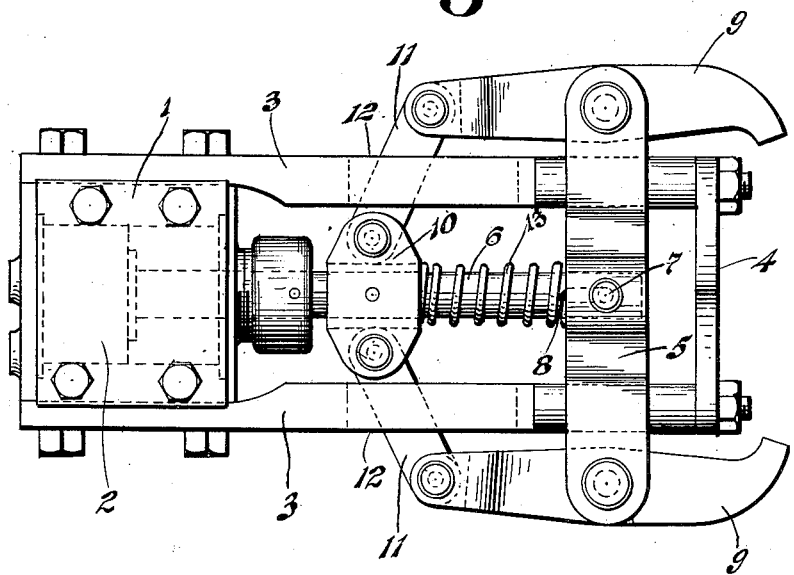
Inventor
Thomas Stenhouse.
Eccleston & Eccleston
Attorneys April 21, 1925. 1,534,878
T. STENHOUSE
CLAMP FOR GLASS MOLDS
Filed Sept. 17, 1923 2 Sheets-Sheet 2
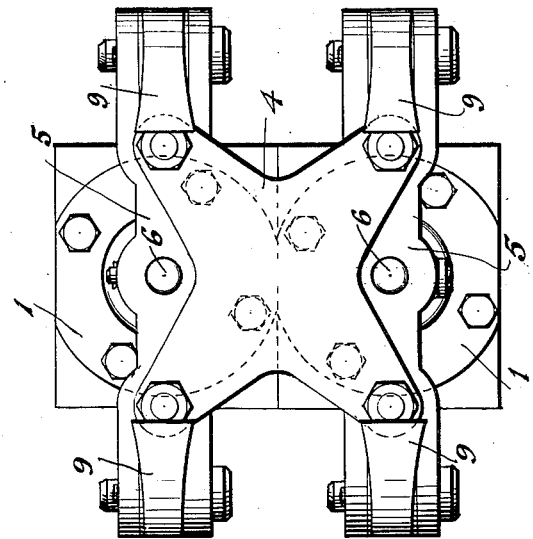
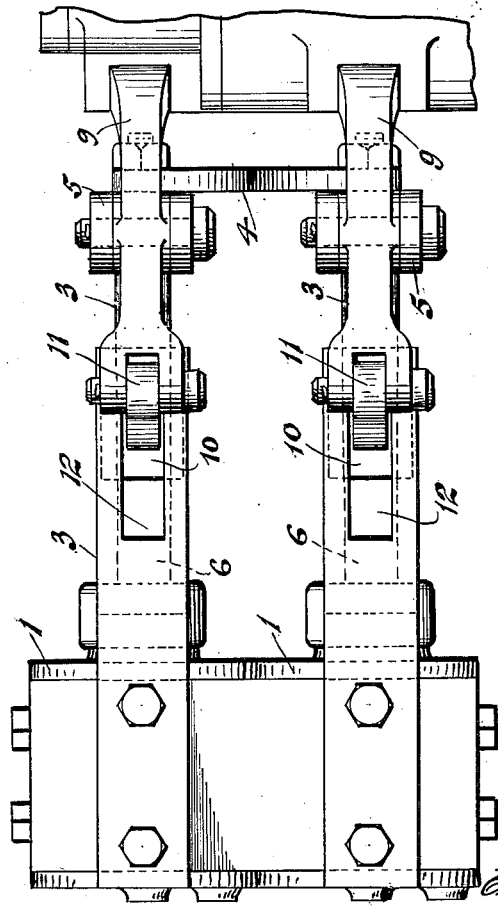
Inventor
Thomas Stenhouse
Eccleston & Eccleston
Attorneys Patented Apr. 21, 1925.

1,534,878

UNITED STATES PATENT OFFICE.

THOMAS STENHOUSE, OF WASHINGTON, PENNSYLVANIA, ASSIGNOR TO HAZEL-ATLAS GLASS CO., OF WHEELING, WEST VIRGINIA, A CORPORATION OF WEST VIRGINIA.

CLAMP FOR GLASS MOLDS.

Application filed September 17, 1923. Serial No. 663,221.

*To all whom it may concern:*

Be it known that I, THOMAS STENHOUSE, a citizen of the United States, and a resident of Washington, in the county of Washington and State of Pennsylvania, have invented certain new and useful Improvements in Clamps for Glass Molds, of which the following is a full, clear, and exact description.

The subject-matter of this application is disclosed in combination with a jug machine in my application Serial No. 676,570, filed November 23, 1923.

In glass-forming machines a rotary table or carrier is employed, and mounted thereon is a series of molds; the molds being formed in halves and pivotally connected, so that they may be swung to open position to permit removal of the formed articles. The carrier is rotated step by step, in the well known manner, to the successive operating positions, and in certain of these positions it is necessary, of course, that the mold halves be securely clamped together, and at the proper instant they must be released to permit the mold to travel to the next station for the succeeding operation or for removal of the article.

In the operation of previously known mold clamps of this character there is usually the liability that the clamp in its travel back and forth will exert a displacing pressure on the mold and force it out of position; and one of the objects of the present invention is to provide a mold clamp which will exert only a pinching or closing pressure on the mold and which will not have any tendency whatever to displace the mold.

Another object of the invention is to provide an apparatus of this character which is more simple in construction than similar devices previously known.

Other advantages of the invention will be apparent to those skilled in the art from the following description when taken in connection with the accompanying drawings, in which:

Figure 1 is a plan view of the apparatus in its operative or closed position, and showing in dotted lines the position assumed by the jaws and links when in open position, but before being withdrawn.

Figure 2 is a view similar to Figure 1, but showing the device in its inoperative or withdrawn position.

Figure 3 is a side elevation of the apparatus and showing a pair of superposed clamps as used in connection with neck and body molds; and Figure 4 is an end view of the apparatus.

In the embodiment of the invention illustrated herein two superposed clamps are employed, but, as the upper and lower clamp and operating mechanism are identical in construction, a description of one of them will suffice.

Referring to the drawings more in detail, numeral 1 indicates an ordinary cylinder provided with a piston 2, and preferably operated in the usual manner by air or other fluid pressure. Guide rods 3, 3 are attached to the cylinder mounting and extend forwardly in spaced parallel relation, as clearly indicated in Figures 1 and 2. The guide rods 3, 3 are connected at their forward ends; and, as two complete mold clamps are employed in the construction illustrated herein, I prefer to employ a plate 4 (Figure 4) for this purpose, whereby all four of the guide rods are maintained in proper spaced and parallel relation. Obviously, if only a single unit were employed then an ordinary cross-bar would be substituted for the plate 4.

A crosshead 5 is slidably mounted on the guide rods 3, 3 and this crosshead is connected to the piston rod 6 carried by the piston 2. The crosshead is connected to the piston rod by a pin and slot connection, as indicated by numerals 7 and 8, respectively, whereby relative movement between the crosshead and piston rod is permitted.

Clamping jaws 9, 9 are pivotally mounted on the crosshead 5, and these pivotally mounted jaws are operatively connected to a head-piece 10 by means of pivotally mounted links 11, the head-piece 10 being mounted on the piston rod 6 in fixed relation thereto. The links 11 operate through slots 12 provided in the guide rods 3, 3 for that purpose.

A coil spring 13 is mounted on the piston rod 6 between the crosshead 5 and head-piece 10, and normally holds the crosshead in its forward position on the piston rod, for a purpose to be described hereinafter.

By reference to Figures 3 and 4, it will be noted that I have illustrated two identical superposed units adapted particularly for use in connection with neck and body molds, but it will be understood, of course, that the invention is not limited to such a construction, for it is obvious that a single unit may be employed in exactly the same manner with any type of mold requiring only a single clamping device.

The operation of the apparatus will now be described; it being assumed that the clamp is in its withdrawn or inoperative position, as illustrated in Figure 2.

The admission and exhaust of air to the operating cylinder is, of course, in timed relation with the operation of the glass machine, and as mechanism for accomplishing this synchronous operation is old and well known it is neither illustrated nor described herein. When a mold reaches the station where it is to be clamped, air is automatically admitted to the rear of piston 2, thereby forcing the piston and its rod 6 forwardly. As the rod moves forwardly it carries with it the head-piece 10; and because of the pressure of the coil spring 13 the crosshead 5 is maintained in its foremost position on the piston rod; i. e., the pin 7 remains in the forward end of the slot 8. It is thus seen that there is no relative movement between the crosshead 5 and the head-piece 10, and thus all the parts move forward in exactly the same relative position as they occupy when the device is in inoperative position. This forward movement, without relative change of position of the moving parts, continues until the crosshead 5 contacts with the plate or crossbar 4, and at this point the parts are in the position shown in dotted lines in Figure 1; the clamping jaws still remaining in open position, but having been carried forward until they are in alignment with the ordinary clamping lugs provided on glass molds of the character described herein.

The crosshead 5 remains in its position abutting the member 4, but the pin and slot connection with the piston rod permits the latter to continue its forward movement, carrying with it, of course, the head-piece 10. And obviously this further forward movement of the head-piece causes the clamping jaws, through the connecting links 11, to swing inwardly and clamp the mold in closed position.

From the foregoing description it will be apparent that it is impossible for the clamping apparatus to exert any pressure whatever on the mold tending to displace it; for the clamping jaws are moved to their extreme forward position while still open, and thus it is impossible to subject the mold to any pressure other than the pinching or closing pressure.

At the proper moment the air is released from the rear of the cylinder and pressure is admitted to the front thereof, and the movement of the parts is exactly the reverse of that described above. The spring 13 retains the crosshead 5 in its forward position, while the head-piece moves to the dotted line position shown in Figure 1, thereby moving the clamping jaws to the open position, also shown in dotted lines. At this point the pin 7 strikes the forward end of the slot 8, and further rearward movement of the piston rod carries the parts, in open position, to the inoperative position of the apparatus, as illustrated in Figure 2.

It is believed that the construction and operation of the apparatus will now be clearly understood, and it will be obvious that the apparatus disclosed herein is not only extremely simple in construction, but also will operate in a highly efficient manner and without any danger of displacing the molds.

Various modifications may be made in the apparatus and in the manner of operating the same without departing from the invention, and all such I aim to include in the scope of the appended claims.

Having fully described the invention, what I claim as new and desire to secure by Letters Patent is:

1. A clamp for molds, including a piston rod, a crosshead mounted for limited sliding movement thereon, clamping jaws pivotally mounted on the crosshead, means for moving the crosshead and jaws bodily forward to a fixed position, and means for causing the jaws to swing inwardly into clamping position after the termination of the forward bodily movement.

2. A clamp for molds, including a piston rod, a crosshead mounted for limited sliding movement on the piston rod, clamping jaws pivotally mounted at opposite ends of the crosshead, and a spring normally holding the crosshead in its forward position relative to the piston rod.

3. A clamp for molds, including a piston rod, a crosshead mounted on said piston rod and having a pin and slot connection therewith, whereby limited relative movement is permitted, clamping jaws pivotally mounted at opposite ends of the crosshead, and a spring normally holding the crosshead in its forward position relative to the piston rod.

4. A clamp for molds, including a piston rod, a crosshead mounted for limited sliding movement on said piston rod, clamping jaws pivotally mounted at opposite ends of the crosshead, a spring normally holding the crosshead in its forward position relative to the piston rod, and an abutment limiting the forward travel of the crosshead.

5. A clamp for molds, including a piston rod, a crosshead mounted for limited sliding movement on said piston rod, clamping jaws pivotally mounted at opposite ends of said crosshead, a head-piece fixed to the piston rod, links operatively connecting the clamping jaws and head-piece, and a spring normally holding the crosshead in its forward position relative to the piston rod.

6. A clamp for molds, including a piston rod, a crosshead mounted for limited sliding movement on said piston rod, clamping jaws pivotally mounted at opposite ends of said crosshead, a head-piece fixed to the piston rod, links operatively connecting the clamping jaws and head-piece, a spring normally holding the crosshead in its forward position relative to the piston rod, and an abutment limiting the forward travel of the crosshead.

7. A clamp for molds, including a piston rod, a crosshead mounted for limited sliding movement on said piston rod, clamping jaws pivotally mounted at opposite ends of the crosshead, toggle links connected to the rear ends of the clamping jaws and to a fixed point on the piston rod, a spring normally holding the crosshead in its forward position relative to the piston rod, whereby the jaws are normally maintained in open position, and an abutment for stopping the forward travel of the crosshead and clamping jaws.

8. A clamp for molds, including a piston rod, two members mounted on said rod, one of said members having a limited sliding movement thereon and the other member being fixed thereon, clamping jaws operatively connected with the fixed member and pivotally mounted at opposite ends of the movable member, a spring normally maintaining the members spaced to full extent, and an abutment for stopping the forward travel of the movable member and clamping jaws.

9. A clamp for molds, including a piston rod, two members mounted on said rod in spaced relation, clamping jaws operatively connected with one of said members and pivotally mounted adjacent opposite ends of the other member, said piston rod adapted to carry the clamping jaws and associated parts bodily back and forth, means for arresting the forward movement of the member carrying the clamping jaws, said member being mounted on the piston rod in such manner as to permit further forward travel of the piston rod.

10. A clamp for molds, including a piston rod, guide rods mounted in horizontal alignment with the piston rod, an abutment at the forward ends of the guide rods, a crosshead slidably mounted on the guide rods and having a lost-motion connection with the piston rod, clamping jaws pivotally mounted adjacent opposite ends of the crosshead, means for normally holding the clamping jaws in open position, and means for swinging the jaws inwardly into clamping position after the crosshead contacts with said abutment.

11. The combination with a hinged mold having clamping lugs thereon, of means for clamping the mold, said means including a piston rod, a crosshead mounted for limited sliding movement thereon, clamping jaws pivotally mounted on the crosshead, means for moving the crosshead and jaws bodily forward to a fixed position with the clamping jaws in alignment with the clamping lugs, and means for causing the jaws to swing inwardly into clamping position after the termination of the forward bodily movement.

12. The combination with a neck mold and body mold formed of hinged sections having clamping lugs, of means for clamping said molds in closed position, said means including two independently operated superposed cylinders, piston rods operated by said cylinders and extending toward the molds in vertical alignment and in spaced parallel relation, a crosshead mounted on each of the rods and having a lost-motion connection therewith, a pair of clamping jaws carried by each of the crossheads, each unit comprising the crosshead and jaws being movable bodily forward independent of the other unit, to a fixed position with the clamping jaws in alignment with the clamping lugs, and means for causing the clamping jaws to swing inwardly into clamping position after the termination of the forward bodily movement.

THOMAS STENHOUSE.